Nov. 5, 1929.  T. VEITCH  1,734,185
FLUID LEVEL INDICATOR
Filed Dec. 5, 1924
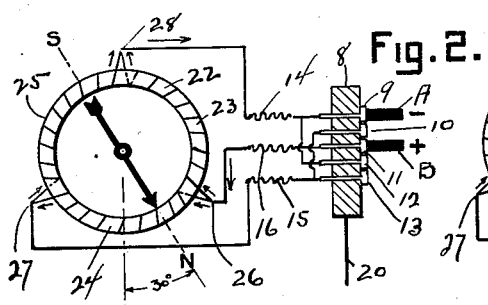
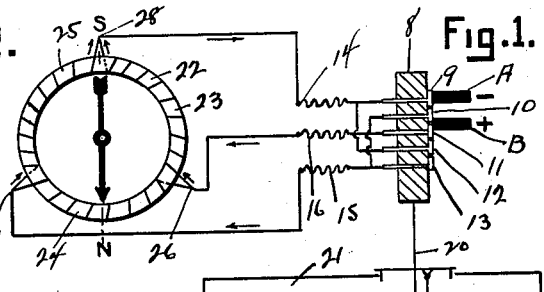
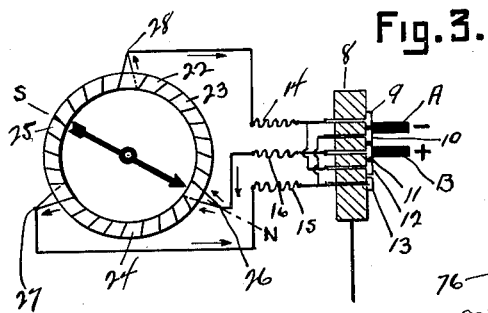
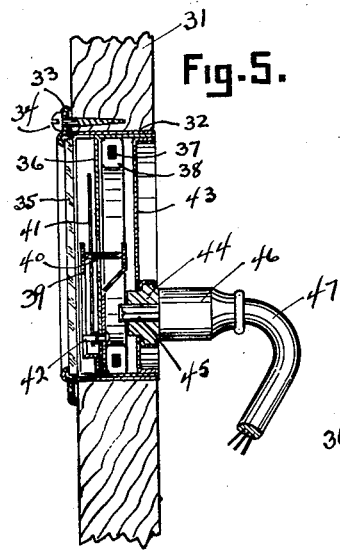
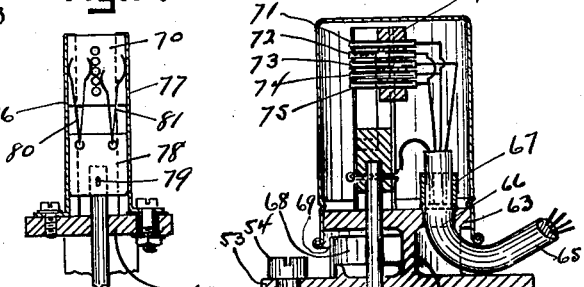
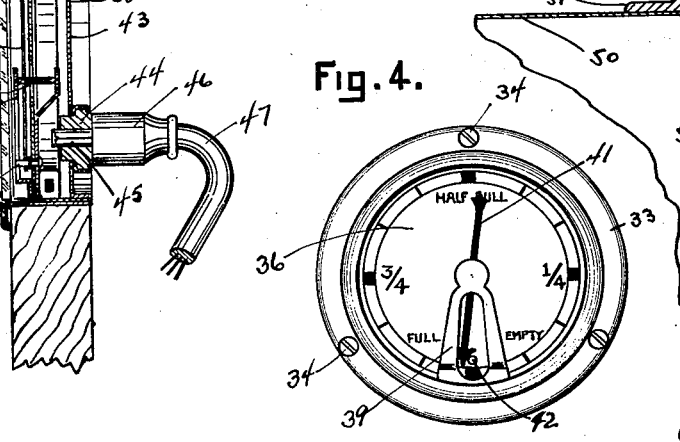
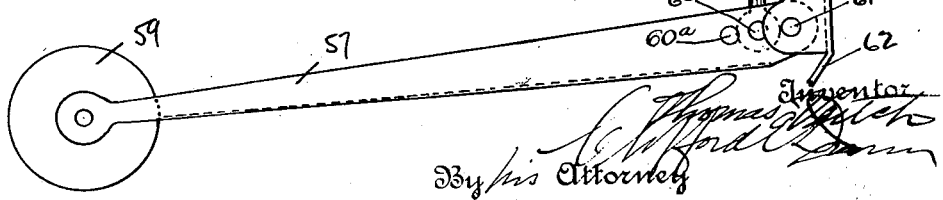

Patented Nov. 5, 1929

1,734,185

UNITED STATES PATENT OFFICE

THOMAS VEITCH, OF BRIELLE, NEW JERSEY, ASSIGNOR OF ONE-HALF TO HENRY L. PEREZ, OF BRONXVILLE, NEW YORK

FLUID-LEVEL INDICATOR

Application filed December 5, 1924. Serial No. 754,006.

This invention relates to a system for indicating at a distance the changes in level or volume of the liquid in tank or receptacles.

While my invention is generally applicable to indicating all relative changes of position at a distance from where it occurs, it is especially adaptable for use in connection with motor vehicles to indicate at the dash or instrument board, to the operator, the changes of level or volume taking place in any liquid receptacle located at various points about the chassis and more particularly the volume or level changes taking place in the fuel tank.

My invention broadly comprehends for use on motor vehicles the provision in the fuel tank of float means for actuating electrical contacts, of an electromagnetic indicator placed on the dash and of electric conductors connecting the contacts with the indicator on the dash.

I shall now proceed to describe the principle of operation of my invention together with one embodiment of my invention with reference to the accompanying drawings, which show a specific and most general application thereof and then proceed to point out with more particularity the essential elements of novelty in the annexed claims.

In the drawings, Figs. 1, 2 and 3 are diagrammatic and show three steps in the movement of the indicator corresponding to three changes of position of the electric contacts or commutator;

Fig. 4 is a front view of the dash indicator;

Fig. 5 is a vertical cross-section of Fig. 4 together with a portion of the instrument board on which it is mounted;

Fig. 6 is a vertical section of the commutator guide and float together with its mounting on the fuel tank; and Fig. 7 is a partial sectional view of the commutator and brush contacts.

Referring now to the drawings in detail, which illustrate an embodiment of my invention in connection with a motor vehicle fuel supply, like reference numerals are employed to designate similar parts throughout the several views.

The principle upon which my invention operates is illustrated in Figs. 1, 2 and 3, and these will first be described. 8 is a commutator of insulating material carrying the metal commutator bars 9, 10, 11, 12 and 13. Bars 9—12 are connected together at the back of block 8 as are also bars 10—13. The two groups together with bar 11 are connected to the three conductors 14, 15 and 16 respectively. (The object of grouping and connecting the commutator bars is to secure, with a reciprocating commutator, the same circuits that would be obtained by using a three bar circular commutator and rotating it through 360 degrees.)

The commutator 8 is located directly above the fuel tank 21 and is adapted to be moved up and down by means of the float 17, located within the tank, the arm 18, the link 19 and the rod 20. In the position shown the tank is empty and the float and commutator are in the lowest position, at which point the two current carrying brushes A and B are so located that A bears upon the middle of bar 9 and brush B contacts with bars 10 and 11 equally. The brushes A and B are preferably connected to the source of ignition current and the negative brush A may be grounded, thus requiring but one wire from the commutator to the battery.

The indicating part of my invention is preferably located on the instrument board in front of the operator and comprises in essentials a magnetizable metal ring 22, wound with three equally spaced coils 23, 24 and 25 of insulated wire having the same number of turns and the same resistance and covering the same length of circular arc. The coils are wound in the same direction and the beginning of one coil is joined to the end of the adjacent coil at points 26, 27 and 28. The three conductors 16, 15 and 14 from the commutator 8 are electrically connected to the three coils at the three points of junction 26, 27 and 28 respectively.

At the center of the ring 22 is freely pivoted a preferably arrow shaped magnetized hand 29 having its north seeking pole at the arrow point. Still referring to Fig. 1 the operation is as follows: Current entering brush B flows outward through both conductors 16 and 15 and enters coils 23 and 25, passing out at the junction 28 and along conductor 14 to brush A. Coil 24 is thus for the moment short-circuited. Due to the current flow, north and south consequent poles are formed in the core of the ring at the points marked N—S, and consequently the hand 29 will take the position shown, along this line.

With a commutator of five bars as shown and a ring core wound with three coils I am able to secure twelve steps or positions of the magnetized hand, corresponding to twelve angular steps of 30 degrees each. The first step of 30 degrees from the position of the hand shown in Fig. 1 is shown in Fig. 2. The commutator has moved upward one twelfth of its travel, bar 9 has moved until brush A is at its edge and bar 10 has moved out of contact with brush B. The current now passes out through circuit 16 alone and enters the coils at junction 26 and divides, one third passing through coils 24 and 25 and two thirds passing through coil 23. As the magnetizing strength of coil 23 is greater than coils 24 and 25 the north and south poles will be moved around to the line marked N—S or to a diameter parallel with the ends of coil 23. This line is 30 degrees removed in a counterclockwise direction from the N—S line of Fig. 1.

In Fig. 3 the float is assumed to have moved two twelfths of its total upward travel and the commutator moved correspondingly so that the brush A contacts equally with bars 9 and 10 and brush B contacts with bar 11 alone. In this case the current will travel out along conductors 16 dividing equally at junction 26 and returning through circuits 14 and 15. The N—S line will in this case stand two steps or 60 degrees from its position in Fig. 1 and will occupy the position shown in Fig. 3. In filling the tank with liquid the float 17 will move upward and carry with it the commutator 8, producing in connection with the brushes A and B twelve combinations of circuits in the coils 23, 24 and 25. The electric current flowing through these circuits produces a progressive step by step rotation of the N—S line, 30 degrees at a time, throughout the 360 degrees (the magnetized and freely pivoted hand 29 follows the N—S line rotation and indicates to the operator the movement of the float in the tank).

For example the positions assumed by the hand are successively attained by the following connections of the commutators:

| 1 | 9 | 10 and 11 |
| 2 | 9 | 11 |
| 3 | 9 and 10 | 11 |
| 4 | 10 | 11 |
| 5 | 10 | 11 and 12 |
| 6 | 10 | 12 |
| 7 | 10 and 11 | 12 |
| 8 | 11 | 12 |
| 9 | 11 | 12 and 13 |
| 10 | 11 | 13 |
| 11 | 11 and 12 | 13 |
| 12 | 12 | 13 |

If it is desirable to have a smaller step movement of the hand than 30 degrees, more coils may be used but they must be of an odd number. For example starting with three, the smallest number, five, seven, or nine, etc., may be employed. As each coil produces four steps or poles in the arc space it covers, the number of steps produced will be the number of coils used multiplied by four.

My indicating system measures up to the rigid requirements of the motor vehicle in that it has no delicate moving parts subject to vibration, it does not depend on calibrated springs for accuracy, but indicates the "distance travel" of the float and commutator by a "distance movement" of the hand, that is direct reading without the intervention of a multiplying gear or the necessity of a translation from pressure to distance. As a definite position of the commutator produces a definite location of the indicating hand it is obvious that as long as my system operates at all it must be accurate. While the power consumption (about one tenth of a watt) produces no harmful drain on the battery, the commutator current may be carried through the ignition switch so that when the motor is shut down no current will be used but when the ignition is again switched on the indicator hand will take its current position as determined by the float position.

The dash indicator of the preferred embodiment of my invention for use on motor vehicles is shown in Figs. 4 and 5; numeral 31 representing a section of the instrument board 32 a metal casing with a flange 33 through which screws 34 pass for securing the casing to the board. A glass 35 is secured in the front of the casing in the usual way. The dial 36 is made of non-magnetic metal, preferably in the form of a shallow cup just fitting inside of the casing 32 and adapted to contain inside its rim and against the back face, the magnetic ring core 37 wound with the three equal coils of insulated wire 38. A U-shaped pivot support is secured to the dial, one leg being at the front of the dial and the other leg at the back. Freely journalled in support 39 is a pivot 40 to which is secured the magnetized hand 41, in such a way that it may rotate just in front of the dial through 360 degrees. The dial is graduated and marked on its face to show the relative volume of the tank, such as the quarter volume indication shown in Fig. 4 and preferably with the twelve steps taken by the hand. If desired the dial face may show the tank volume in gallons. A stud 42 is secured to the dial preferably at the lowest central position to serve as a stop for the hand 41 and to differentiate between "full" and "empty" positions of the hand. The back 43 of the indicator is preferably secured to the dial cup 36 and carries an insulated socket piece 44, having three tubular metal sockets 45 connected each to a junction point of the three coils 38. A plug 46 having three points and a three wire cable 47 serve to connect the coils 38 with the commutator on the tank.

The float and commutator adapted for motor vehicle fuel tanks will now be described. 50 is the tank top, 51 the screw flange that at present takes the tank gauge and into this is screwed the adaptable flange 52. The commutator support and plunger guide 53 is secured to the flange 52 by the screw 54. Projecting downward from 53 and into the tank stuffing box for the plunger 56 and as a fulcrum for the float arm 57 and link 58. A float 59 preferably of cork and cylindrical is secured to the end of arm 57 and is adapted to float on the surface of the liquid in the tank and move the plunger 56 through a distance proportionally smaller than its travel. For fitting to tanks of different depths the pivoting centre distance between 60 and 61 may be made variable and marked for the different depths. This may be accomplished in any convenient way. A simple form is herein illustrated in which an additional opening 60^A for the pivot is provided, spaced further from the pin 61 than the pivot 60. Above the flange 53 is a circular base plate 63 integrally secured to it by the U-shaped web 64 which serves as a pocket for the electric cable 65 which passes up through a hole 66 in the plate 63 and is firmly secured thereto by the clip 67. On the other side of the web 64 the plunger 56 passes through a pocket 68 open to the air except for the baffle 69. This open pocket is to prevent liquid fuel from welling up into the commutator chamber above the plate 63.

The commtuator block 70 consists preferably of a die moulded shape of insulating material carrying the five metal pins 71, 72, 73, 74 and 75, arranged in a row and not touching each other. This block is secured by two grooves to the upper edge of two channel shaped metal guides 76 and 77 secured to the plate 63, one may be grounded on this plate and the other insulated as shown, in Fig. 7. Secured to the upper end of the plunger 56 by the key 79 is a brush support 78 made preferably from die moulded insulating compound and adapted to slide between the channels 76 and 77. The brushes 80 and 81 are preferably of spring brass strip bent at the center into a V-shape and secured to the upper end of the brush support 78 and adapted, one to bear against the channel 76 and one side of the commutator bars and the other against channel 77 and the other side of the commutator.

Commutator bars 71 and 74 are connected together at the back and then to one wire of the cable 65, bars 72 and 75 are also connected together and to another wire of the cable and bar 73 is connected to a third wire of the cable. The fourth wire of the cable is the battery wire and is connected to the insulated channel 77. Except that the brushes move, the circuits formed in the coils 38 are exactly the same as those formed in the coils of the diagrams Figs. 1, 2 and 3 and the hand 41 moves exactly the same as does hand 29 of the diagrams upon the movements of the float in the tank.

My invention having been thus fully described, what I claim and desire to secure by Letters-Patent is:

1. A device of the character described comprising, in combination, an indicator having a plurality of electrical coils arranged in a closed series symmetrically disposed about an axis, and having terminals connected to the junctures between them, an indicator responsive to said electrical coils, a circuit changer comprising a plurality of contacts one less than twice the number of coils, said contacts forming a series of two aligned groups of $n$ and $n^1$ contacts, respectively, where $n$ is the number of coils, contacts of the first group being successively connected to the coil terminals and contacts of the second group being parallelled in sequence with those of said first group, the central contact of the series thereby being the sole contact to one terminal, means cooperating with said contacts whereby said coils are energized to produce a resulting field in any one of $4n$ different planes, said brushes and said contacts being movable relative to each other, a float and connections between said float and said circuit changer for effecting said relative movement from said float.

2. A device of the character described comprising in combination an indicator having a plurality of magnetic field producing means arranged in a closed series symmetrically disposed around an axis and having terminals connected to the junctures between them, an indicator member responsive to the joint action of said field producing means, a circuit changer comprising a plurality of contacts arranged in sequence and equal in number to one less than twice the number of terminals, means for connecting one after another in succession all of the successive contacts of the plurality to the successive terminals in rotation around the axis, a pair of brushes connected to the opposite sides of a source of supply and spaced apart in the direction of extension of said series of contacts, said brushes and contacts being movable relative to each other and the spacing of the brushes being such that the brushes in their movement will energize the field producing means in permutation to produce resultant fields equal in number to four times the number of the field producing means each in a direction different from the others and means for controlling the relative position of the brushes and contacts.

THOMAS VEITCH.